United States Patent [19]

Kumano

[11] Patent Number: 4,652,770
[45] Date of Patent: Mar. 24, 1987

[54] POWER SOURCE DEVICE FOR A LOAD WITH A STAND-BY POWER SUPPLY SYSTEM

[75] Inventor: Masayoshi Kumano, Amagasaki, Japan

[73] Assignee: Mitsubishi Denki Kabushiki Kaisha, Tokyo, Japan

[21] Appl. No.: 809,711

[22] Filed: Dec. 17, 1985

[30] Foreign Application Priority Data

Dec. 18, 1984 [JP] Japan ................................ 59-266999

[51] Int. Cl.⁴ .............................................. H02J 9/04
[52] U.S. Cl. ........................................ 307/66; 307/46; 307/87
[58] Field of Search ....................... 307/46, 48, 64, 66, 307/87

[56] References Cited

U.S. PATENT DOCUMENTS 3,909,621 9/1975 Nollace et al. ......................... 307/87
3,932,764 1/1976 Corey .................................... 307/87

OTHER PUBLICATIONS

"Solar Power System for a Collective Housing", Takateru Tuji, Feb. 19, 1985.

Primary Examiner—William H. Beha, Jr.
Attorney, Agent, or Firm—Leydig, Voit & Mayer

[57] ABSTRACT

A power source device according to this invention comprises a voltage and phase detector for detecting the voltage and phase of a power supply system, a first controller for controlling an inverter so that an output of the inverter may agree with either a reference voltage and a reference phase or with the voltage and the phase of the power supply system, a second controller for switching the inputs of the first controller from the reference voltage and phase to the power supply system voltage and phase, or vice versa, when the phases of a reference oscillator and the power supply system have agreed, and a third controller for switching the power to a load from the inverter to the power supply system, or vice versa, when the synchronism between the inverter output and the power supply system has been detected.

3 Claims, 2 Drawing Figures

POWER SOURCE DEVICE FOR A LOAD WITH A STAND-BY POWER SUPPLY SYSTEM

BACKGROUND OF THE INVENTION

This invention relates to an independent dispersive power source which employs a solar battery or the like as an electric source and which feeds electric power to a load through an inverter, and more particularly to a power source device which can be switched to the feed of electric power from a power supply system as a stand-by electric source in the case of insufficient sunshine or any abnormality.

FIG. 1 is a block diagram showing a prior-art power source device of this type. Referring to the figure, numeral 1 designates a solar battery, numeral 2 an accumulator which is disposed in parallel with the output of the solar battery 1, numeral 3 an inverter which changes the D.C. power of the constituent 1 or 2 into an alternating current of predetermined frequency and voltage, and numeral 4 an output transformer. An A.C. switch 5a turns 'on' or 'off' the output from the inverter 3, while an A.C. switch 5b turns 'on' or 'off' electric power from a system to be described below. Numeral 6 indicates a load, and numeral 7 the power distribution system (stand-by power supply system). A control circuit 8 for the inverter 3 is constructed of a reference oscillator 10 of quartz or the like which determines the frequency of the inverter 3, a reference voltage source 11 which generates the output voltage reference of the inverter 3, means 12 to detect the output voltage of the inverter 3, an amplifier 13 which amplifies the deviation between the voltages of the reference voltage source 11 and the output voltage detection means 12, a PWM circuit 14 which generates a signal determinative of the pulse width of the inverter 3 in accordance with the amplified voltage deviation signal, and a gate circuit 15 which amplifies the signal from the PWM circuit 14 and gives drive signals to the frequency switches of the inverter 3.

Next, the operation of the power source device will be described. D.C. power generated in the solar battery 1 is changed into the A.C. power of predetermined frequency and voltage in the inverter 3 under the action of the control circuit 8, and the A.C. power is fed to the load 6 through the output transformer 4 as well as the A.C. switch 5a. In this case, the switch 5b for the feed from the system 7 is open, and a complete independent power source loop is established. As regards the inverter 3, a train of oscillating pulses from the oscillator 10 to determine the output frequency and the amplified signal of the deviation between the output voltage reference signal of the reference voltage source 11 and the output voltage value from the detection means 12 are input to the PWM circuit 14, a train of pulses of pulse widths corresponding to the inputs are output therefrom and are impressed on the gate circuit 15, and the outputs of this gate circuit are distributed to the corresponding semiconductor switches of the inverter 3 so as to drive them, with the result that the output voltage and the frequency of the inverter are held constant. In this manner, the inverter shown here is arranged and operated as is well known.

Meanwhile, the difference between the quantity of the power generation of the solar battery 1 and the quantity of the power consumption of the load 6 is compensated by the charge and discharge of the accumulator 2, to keep both the quantities balanced. However, in a case where insufficient sunshine has continued, the balance cannot be maintained, and the remaining power quantity of the accumulator 2 decreases gradually. Such a case is detected with, e.g., the remaining power quantity of the accumulator 2 as a criterion by an operator or sensing means not shown. Also, a trouble having arisen in the inverter by way of example is detected by sensing means. On this occasion, the operator or the sensing means opens the A.C. switch 5a and thereafter closes the A.C. switch 5b on the system side, thereby to switch the power source device to the feed of power from the system 7. To the contrary, when the sunshine energy has been recovered or the trouble has been eliminated, the feed of power to the load is switched from the system side to the inverter side. At this time, the A.C. switch 5b is first opened, and the A.C. switch 5a is thereafter closed. Subsequently, the inverter needs to feed the load with power after, if necessary, it is started with the so-called soft start of gradually increasing a voltage in order to suppress the inrush currents of a transformer etc. included in the load.

In the prior-art power source device thus far described, the conventional inverter control circuit which is simple is used. On the other hand, however, the momentary interruption of feed power is inevitable at the time of the switching of the power feed to the load, not only in a case of emergency such as accident, but also in a case of the resumption of normal conditions or the planned switching of power feed required for the operation of the device. When mechanical switches are employed, the period of the interruption amounts to several tens cycles, so that influence on the load appears. Moreover, the problems of turn-on in the opposite phase, etc. arise in a motor load etc. In case of switching the power feed from the system to the inverter, therefore, the aforementioned soft start or the like needs to be performed with a sufficient period for the purpose of preventing the inrush overload of the inverter.

In order to shorten the period of the starting mode, semiconductor switches such as thyristors need to be employed as the A.C. switches 5a and 5b, and the whole device cannot but become complicated and expensive. Even in this case, the momentary service interruption cannot be prevented.

Apart from the independent power source device, there is a device similar thereto which is normally connected in parallel with a distribution system and in which only when an inverter has gotten out of order, it is separated. Also the device of this type involves such problems that the connection with the system incurs influences from the inverter upon the system, such as higher harmonics, reverse voltage and reverse current, and that when the service of the system has interrupted, also the inverter stops. The reason is that, unlike the case of the independent power source device in FIG. 1, the inverter is controlled following up the voltage and frequency of the system received as reference inputs.

SUMMARY OF THE INVENTION

This invention has been made in order to eliminate the disadvantages of the prior-art devices as described above, and has for its object to provide a power source device which can switch power feed loops for a load without momentary interruption and without transient fluctuations.

BRIEF DESCRIPTION OF THE DRAWINGS

In the drawings, the same symbols indicate identical or corresponding portions.

DESCRIPTION OF THE PREFERRED EMBODIMENT

Figure 1:
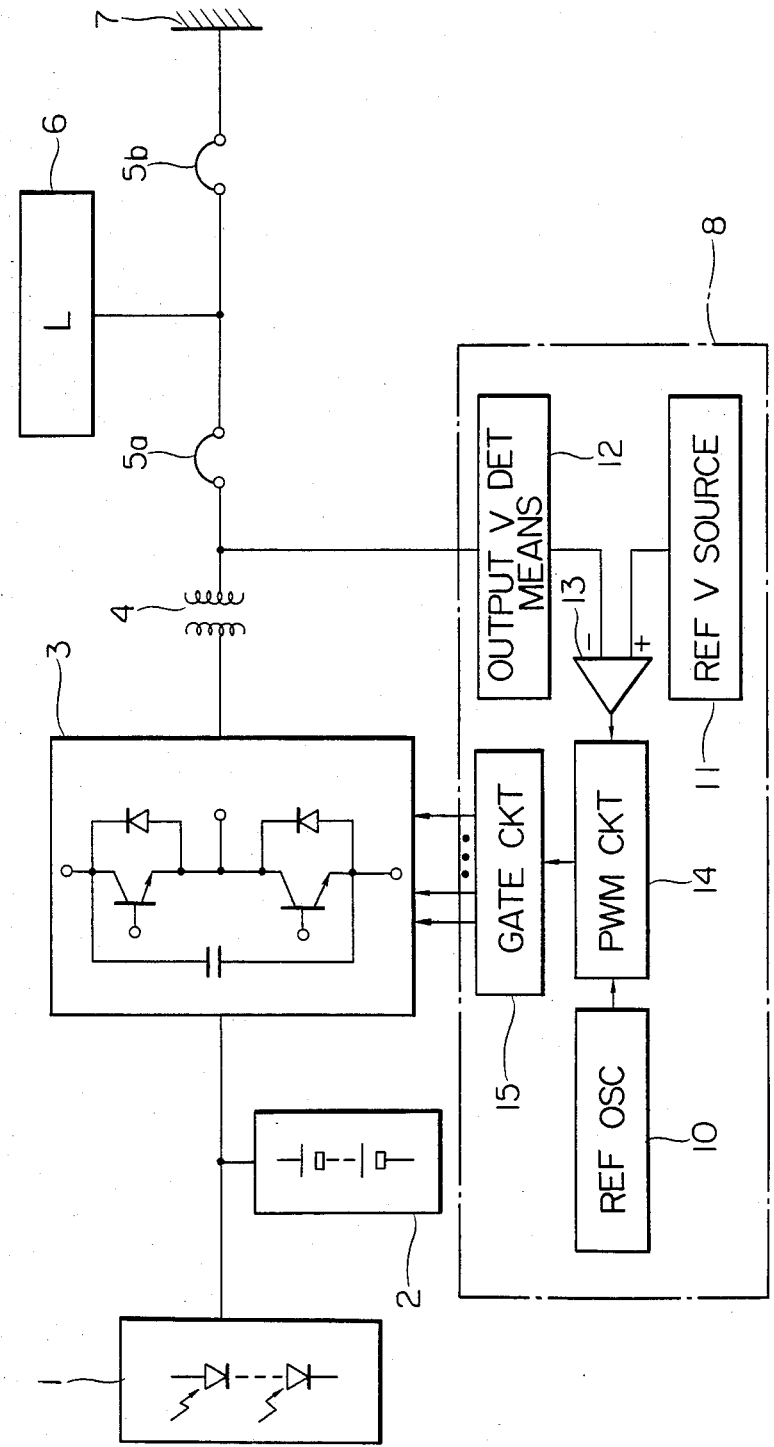
FIG. 1 is a block diagram showing a prior-art power source device.

Now, an embodiment of this invention will be described with reference to the drawing.

Figure 2:
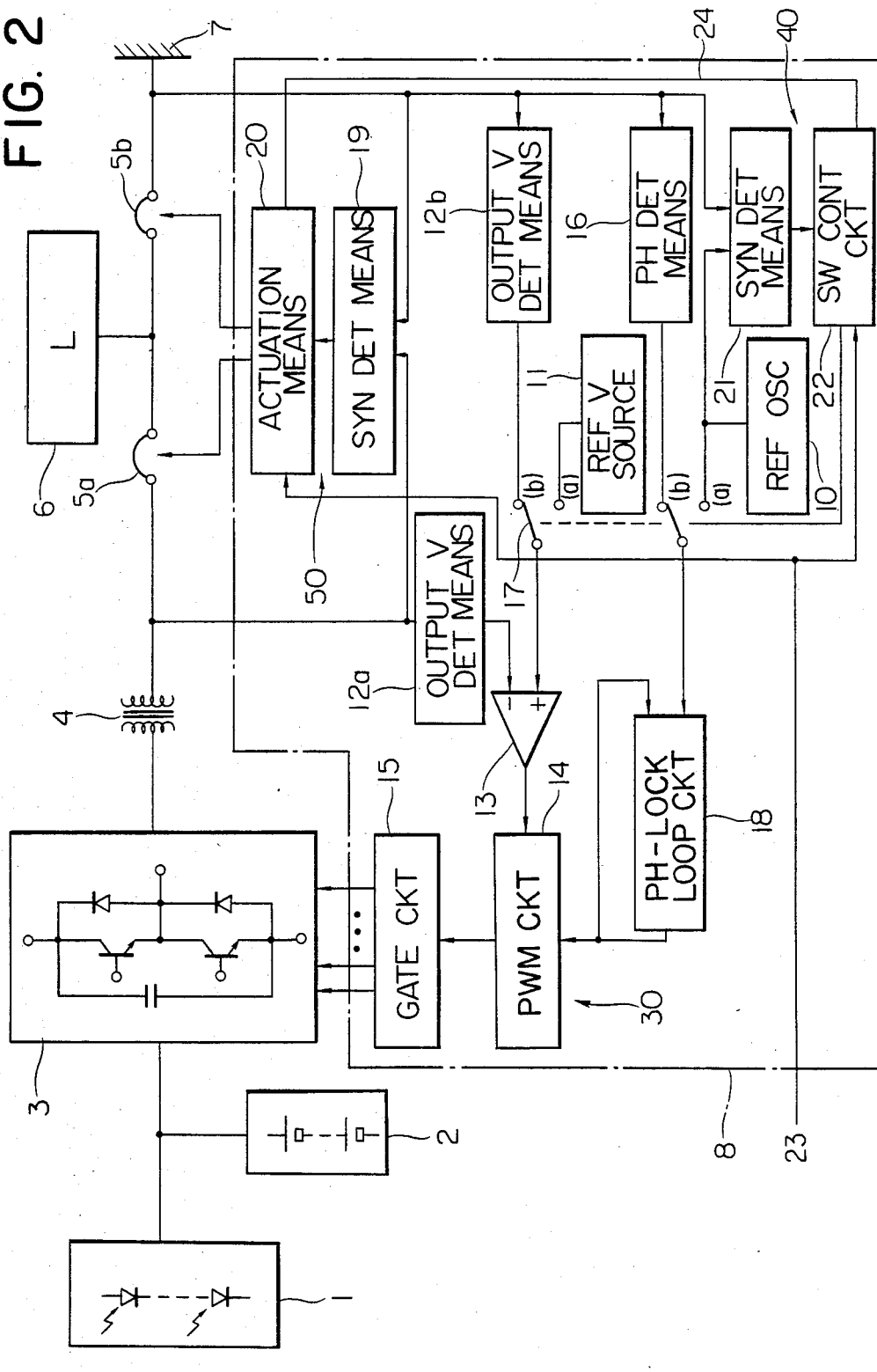
FIG. 2 is a block diagram showing a power source device according to the present invention.

FIG. 2 is a block diagram showing a power source device according to an embodiment of this invention. In the figure, numeral 16 designates means to detect the phase of the power supply system 7, and numeral 17 a control signal change-over switch which changes-over the control references of the voltage and frequency of the output of the inverter 3 between independent references and system references. Shown at numeral 18 is a phase-lock loop circuit (hereinbelow, termed 'PLL') which is well known. Means 19 detects the agreement (synchronism) between the phases as well as voltages of the output of the inverter 3 and the power supply system 7, and actuation means 20 generates actuation signals for the A.C. switches 5a and 5b. Means 21 detects the synchronism between the phase of the reference oscillator 10 of quartz or the like and the phase of the power supply system 7, and a switch control circuit 22 generates a change-over signal for the change-over switch 17. A power feed switching command signal 23 from an operation control panel, a power feed loop control device (detection means) or the like externally disposed, not shown, commands the actuation means 20 and the control circuit 22 to switch the power feed loops. An acknowledgement signal 24 is output from the actuation means 20 to the switch control circuit 22, and indicates the turn-on of the switch 5a and the turn-off of the switch 5b. The control circuit 8 for the inverter 3 is constructed of the above constituents 16–22 and the same components 10–15 as in the prior art of FIG. 1.

First control means 30 is constructed of the amplifier 13, PWM circuit 14, PLL 18 and gate circuit 15. Second control means 40 is constructed of the phase synchronism detection means 21, switch control circuit 22 and changeover switch 17. Third control means 50 is constructed of the synchronism detection means 19 and switch, actuation means 20. Numerals 1–7 indicate the same components as in the prior art.

Next, the operation of the embodiment will be described. There will be first explained a case where, in the state in which power is fed from the power supply system 7 to the load 6 with the A.C. switch 5b closed and the A.C. switch 5a opened, the inverter 3 is started to switch the power source device to power feed from this inverter. Operations for starting the inverter are the same as in the prior art of FIG. 1. At first, the control signal change-over switch 17 is connected to the system side (side b in FIG. 2). The phase of the system detected by the phase detection means 16 is input to the PLL 18 through the switch 17, and the train of output pulses of the PLL 18 are synchronized with the system phase. On the other hand, the voltage of the system detected by the voltage detection means 12b is input to the voltage deviation amplifier 13 as a reference value and is compared with the output voltage of the inverter detected by the output voltage detection means 12a, and the deviation of both the voltages is amplified. Along with the aforementioned output pulse train of the PLL 18, the amplified signal is input to the PWM circuit 14, the output of which is input to the inverter 3 through the gate circuit 15. By driving the inverter 3 with the output of the gate circuit 15, the output voltage and phase thereof can be caused to follow up the system. If the power system 7 and the output of the inverter 3 have agreed with respect to the voltage and the phase and the agreement has continued for a predetermined period of time, this situation is sensed by the synchronism detection means 19. Then, the actuation means 20 is operated by the power feed switching command signal 23 and a detection signal from the synchronism detection means 19, to close the inverter side A.C. switch 5a and thereafter open the system side A.C. switch 5b. On this occasion, the inverter output and the system are connected for a moment. Since, however, the inverter output is synchronous with the system, any trouble ascribable to a transient phenomenon does not arise. At the point of time at which the power supply system 7 and the inverter output have agreed with regard to the voltage and the phase, the agreement of the phases is detected also by the synchronism detection means 21. At this time, however, the acknowledgement signal 24 is not applied to the switch control circuit 22 yet. Therefore, the control circuit 22 does not operate, so that the switch 17 does not change-over to the side a.

After the power feed to the load has been switched in this manner, the point of time at which the oscillation phase of the independent oscillator 10 and the phase of the system have agreed is sensed by the synchronism detection means 21 (although the phases are asynchronous, they are infallibly synchronized in a certain period because the frequency of the system side somewhat changes at all times). Then, the switch control circuit 22 is operated by a sensing signal from the synchronism detection means 21 and the acknowledgement signal 24, to change-over the control signal change-over switch 17 to the side a. As a result, the inverter output is thenceforth controlled with reference to the independent reference oscillator 10 and reference voltage source 11 irrespective of the state of the system.

Secondly, there will be explained a case where, conversely to the above, the inverter is stopped to switch the power feed for the load to the system. At the point of time at which the agreement between the phase of the oscillator 10 and the phase of the system has been detected, the control reference change-over switch 17 thrown on the side a is changed-over to the side b on the basis of the power feed switching command signal 23 and by the operation of the synchronism detection means 21 (since the conditions of turning 'on' the switch 5a and 'off' the switch 5b have already been satisfied, the acknowledgement signal 24 is applied to the control circuit 22, so that this control circuit 22 is operated as soon as it receives the synchronism signal from the synchronism detection means 21). Then, the output of the inverter 3 is controlled following up the system 7. When the voltage and phase of the inverter output have agreed with those of the system under the power feed switching command signal 23 and owing to the function of the synchronism detection means 19 and the agreement has stably continued for a predetermined period of time, the system side A.C. switch 5b is closed and the inverter side A.C. switch 5a is thereafter opened.

Thereafter, the inverter 3 is stopped by operations similar to those of the prior art.

In this manner, with the device of the present embodiment, the switching of the power feed to the load is free from the momentary interruption and can be smoothly executed without accompanying the transient phenomenon such as inrush current, so that a mechanical switch of slow operation can be used as the change-over switch.

The embodiment does not involve the momentary service interruption, the drawbacks of the prior art including the increased transient capacity of the inverter attended with the inrush current and the increased cost attended with the use of the high-speed semiconductor switches, or the various problems attended with the connection to the power supply system as in the method wherein the power source device is normally connected with the power supply system. Accordingly, it is effective to provide a power source device which is comparatively simple in arrangement, low in cost and high in reliability.

While the above embodiment has been described as switching the power feed from the inverter to the power supply system and vice versa, only either of the switching from the inverter to the power supply system and the switching in the reverse direction may well be performed.

The power feed switching signal 23 can discriminate the switching direction between the inverter and the power supply system in accordance with the sign etc. thereof or by supplying it to the actuation means 20 and the switch control circuit 22 individually.

In the above embodiment, regarding the change-over of the control references, the phase and voltage references are simultaneously changed-over at the point of time at which the phases of the system and the inverter output have agreed. This is done because the inverter and the load are affected comparatively little by voltage fluctuations during the service of the independent power source. Naturally, when the voltage and the phase are separately detected so as to change-over the respective control references, the change-over can be executed more smoothly.

As thus far described, according to the power source device of this invention, an apparatus wherein a power supply system is used as a standby power source and wherein a load is fed with electric power by a power source having an inverter is so constructed as to be capable of performing the following two operations (1) and (2) ((1)→(2) for switching from the inverter side to the system side, and (2)→(1) for the reverse switching from the system side to the inverter side):

(1) Control reference for controlling the voltage and phase of an inverter output are made a voltage reference and an oscillation reference which are independent. When they are changed-over with respect to the voltage and phase of the system, the mutual change-over is done in the course of the power feed to the load by the inverter and at the point of time at which the reference oscillation and the system phase have been synchronized.

(2) In switching the power feed from the inverter to the load and power feed from the system thereto, the control references of the inverter are made the voltage and phase of the system, and the inverter output is caused to follow up the system. When the voltage and phase of the inverter output have thus agreed with those of the system, the inverter and the system are once connected for a moment. Thereafter, the inverter or the system having fed the electric power to the load is separated. Therefore, the invention has the effect that the power feed to the load is permitted to be switched without momentary interruption and smoothly without accompanying any transient phenomenon such as inrush current.

What is claimed is:

1. A power source device for a load with a stand-by power supply system, the power source device comprising an independent dispersive power source, an inverter by which D.C. power from said independent dispersive power source is changed into A.C. power, two switches which serve to feed said load with electric power of either said inverter or the stand-by power supply system, a reference voltage source which generates a voltage signal serving as a reference of the inverter output, a reference oscillator which generates a frequency signal serving as a reference of the inverter output, voltage detection means to detect a voltage of said power supply system serving as a reference of the inverter output, phase detection means to detect a phase of said power supply system serving as a reference of the inverter output, first control means to control said inverter so that the inverter output may agree with either of both the reference voltages and the phases, second control means functioning in a mode of switching power feed loops for said load to change-over the reference voltage and phase as inputs to said first control means onto the new closure side when the phases of said reference oscillator and said power supply system have agreed, and third control means functioning in the mode of switching the power feed loops for said load to close one of said two switches on the new closure side in accordance with synchronism between the inverter output and said power supply system so that when said power supply system is to be closed anew, said second control means operates previously to said third control means, whereupon said third control means once connects said inverter and said power supply system in parallel in response to the closure of said switch on the power supply system side and thereafter opens said switch on the inverter side.

2. A power source device for a load with a stand-by power supply system, the power source device comprising an independent dispersive power source, an inverter by which D.C. power from said independent dispersive power source is changed into A.C. power, two switches which serve to feed said load with electric power of either said inverter or the stand-by power supply system, a reference voltage source which generates a voltage signal serving as a reference of the inverter output, a reference oscillator which generates a frequency signal serving as a reference of the inverter output, voltage detection means to detect a voltage of said power supply system serving as a reference of the inverter output, phase detection means to detect a phase of said power supply system serving as a reference of the inverter output, first control means to control said inverter so that the inverter output may agree with either of both the reference voltages and the phases, second control means functioning in a mode of switching power feed loops for said load to change-over the reference voltage and phase as inputs to said first control means onto the new closure side when the phases of said reference oscillator and said power supply system have agreed, and third control means functioning in the mode of switching the power feed loops for said load to close one of said two switches on the new closure side in accordance with synchronism between the inverter output and said power supply system so that when said inverter is to be closed anew, said third control means operates previously to said second control means, whereupon said third control means once connects said inverter and said power supply system in parallel in response to the closure of said switch on the inverter side and thereafter opens said switch on the power supply system side.

3. A power source device for a load with a stand-by power supply system, the power source device comprising an independent dispersive power source, an inverter by which D.C power from said independent dispersive power source is changed into A.C. power, two switches which serve to feed said load with electric power of either said inverter or the stand-by power supply system, a reference voltage source which generates a voltage signal serving as a reference of the inverter output, a reference oscillator which generates a frequency signal serving as a reference of the inverter output, voltage detection means to detect a voltage of said power supply system serving as a reference of the inverter output, phase detection means to detect a phase of said power supply system serving as a reference of the inverter output, first control means to control said inverter so that the inverter output may agree with either of both the reference voltages and the phases, second control means functioning in a mode of switching power feed loops for said load to change-over the reference voltage and phase as inputs to said first control means onto the new closure side when the phases of said reference oscillator and said power supply system have agreed, and third control means functioning in the mode of switching the power feed loops for said load to close one of said two switches on the new closure side in accordance with synchronism between the inverter output and said power supply system so that when said power supply system or said inverter is to be closed anew, one of said second and third control means operates previously to the other, respectively, whereupon said third control means once connects said inverter and said power supply system in parallel in response to the closure of said switch on the new closure side and thereafter opens said switch on the other side.

* * * * *